United States Patent
Griot et al.

(10) Patent No.: US 8,929,878 B2
(45) Date of Patent: Jan. 6, 2015

(54) TRANSACTION MANAGEMENT

(75) Inventors: Miguel Griot, San Diego, CA (US);
Osok Song, San Diego, CA (US);
Nagaraja Kumar Maganti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 970 days.

(21) Appl. No.: 12/782,084

(22) Filed: May 18, 2010

(65) Prior Publication Data
US 2011/0130157 A1 Jun. 2, 2011

Related U.S. Application Data

(60) Provisional application No. 61/180,078, filed on May 20, 2009.

(51) Int. Cl.
| | | |
|---|---|---|
| H04W 4/00 | (2009.01) | |
| H04B 1/00 | (2006.01) | |
| H04B 7/00 | (2006.01) | |
| H04W 76/02 | (2009.01) | |
| H04W 76/06 | (2009.01) | |

(52) U.S. Cl.
CPC ............ *H04W 76/021* (2013.01); *H04W 76/06* (2013.01)
USPC ........... 455/422.1; 455/68; 370/328; 370/338

(58) Field of Classification Search
CPC ..... H04L 29/06; H04L 1/0006; H04L 1/1848; H04W 28/04; H04W 80/02; H04W 12/06; H04W 28/10; H04W 76/02
USPC ............ 370/338, 230, 235, 329, 395.21, 328, 370/331, 348, 351; 455/406, 411, 452.1, 455/452.2, 422.1, 68; 714/18
See application file for complete search history.

(56) References Cited

U.S. PATENT DOCUMENTS

| | | | |
|---|---|---|---|
| 5,631,635 A | * | 5/1997 | Robertson et al. ............ 340/7.21 |
| 7,180,883 B2 | * | 2/2007 | Isokangas et al. ............ 370/338 |

(Continued)

FOREIGN PATENT DOCUMENTS

RU 2341915 C2 12/2008

OTHER PUBLICATIONS

3rd Generation Partnership Project; Technical Specification Group Core Network and Terminals; Non-Access-Stratum (NAS) protocol for Evolved Packet System (EPS); Stage 3 (Release 8) 3GPP Standard; 3GPP TS 24.301, 3rd Generation Partnership Project (3GPP), Mobile Competence Centre; 650, Route Des Lucioles ; F-06921 Sophia-Antipolis Cedex ; France, No. V8.1.0, Mar. 1, 2009, pp. 1-250, XP050365238 p. 117.
International Search Report and Written Opinion—PCT/US2010/035480, International Search Authority—European Patent Office—Oct. 7, 2010.

(Continued)

*Primary Examiner* — Matthew Sams
(74) *Attorney, Agent, or Firm* — Anthony R. Morris

(57) ABSTRACT

Transaction identifiers for transactions are managed to mitigate potential mismatches that may occur in the event a message associated with the transaction is not delivered to the intended destination. For example, in the event an access terminal accepts a bearer context request, the access terminal may not immediately release the transaction identifier associated with that transaction. In this way, in the event the access terminal receives a second bearer context request associated with that same transaction identifier (e.g., due to the accept message not reaching the network), the access terminal may send a second accept message in response to the second bearer context request.

58 Claims, 13 Drawing Sheets

(56) References Cited

U.S. PATENT DOCUMENTS

| | | | |
|---|---|---|---|
| 7,746,843 B2* | 6/2010 | Chen et al. | 370/351 |
| 7,911,954 B2* | 3/2011 | Cheng et al. | 370/235 |
| 8,761,091 B2* | 6/2014 | Zisimopoulos et al. | 370/329 |
| 2002/0068545 A1* | 6/2002 | Oyama et al. | 455/406 |
| 2003/0043830 A1 | 3/2003 | Floyd et al. | |
| 2005/0002363 A1* | 1/2005 | Cheng et al. | 370/338 |
| 2006/0258384 A1* | 11/2006 | Edwin et al. | 455/503 |
| 2007/0050777 A1* | 3/2007 | Hutchinson et al. | 718/104 |
| 2007/0053363 A1* | 3/2007 | Chen et al. | 370/395.21 |
| 2007/0288997 A1* | 12/2007 | Meier et al. | 726/4 |
| 2008/0076420 A1 | 3/2008 | Khetawat et al. | |
| 2009/0052384 A1* | 2/2009 | Zisimopoulous et al. | 370/329 |
| 2010/0081393 A1* | 4/2010 | Huang | 455/68 |
| 2010/0081444 A1 | 4/2010 | Jin et al. | |

OTHER PUBLICATIONS

NEC: "CR 23.401: PTI handling and PC0 inclusion" 3GPP Draft; C1-081688, 3rd Generation Partnership Project (3GPP), Mobile Competence Centre ; 650, Route Des Lucioles ; F-06921 Sophia-Antipolis Cedex ; France, vol. CT WG1, No. Cape Town; 20080515, May 15, 2008, XP050028923 [retrieved on May 15, 2008].

3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8), 3GPP Standard; 3GPP TS 29.274,3rd Generation Partnership Project (3GPP), Mobile Competence Centre; 650, Route Des Lucioles ; F-06921 Sophiaantipolis Cedex ; France, No. V8.0.0, Dec. 1, 2008, pp. 1-111, XP050372751.

Taiwan Search Report—TW099115996—TIPO—Mar. 11, 2014.

* cited by examiner

TRANSACTION MANAGEMENT

CLAIM OF PRIORITY

This application claims the benefit of and priority to commonly owned U.S. Provisional Patent Application No. 61/180,078, filed May 20, 2009, the disclosure of which is hereby incorporated by reference herein.

BACKGROUND

1. Field

This application relates generally to communication and more specifically, but not exclusively, to managing transactions.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

When an application running on an access terminal wishes to access a network resource (e.g., to communicate with a server or another access terminal), session management procedures may be employed to establish or modify a bearer for this access. For example, the access terminal may initiate a transaction (e.g., send a message to the network) to cause a bearer to be activated or modified to support the desired access.

Since the access terminal may initiate many of these bearer transactions over time, the access terminal may assign different transaction identifiers to different transactions. The access terminal and the network may then include the appropriate transaction identifier in each message sent for a given transaction. In this way, the access terminal may identify the transaction that is associated with a given message received from the network. Then, when the transaction completes (e.g., upon acceptance of a network request by the access terminal), the access terminal may release (e.g., enable re-use of) the transaction identifier.

In some cases, in the event the network does not receive an expected response to a message (e.g., within a defined period of time), the network may retransmit the message. In the event the access terminal had responded to the message (e.g., accepted a network request), however, the retransmission may include a transaction identifier that the access terminal has already released. In such a case, the access terminal may reject the retransmission. A mismatch may then exist whereby the access terminal is proceeding as if a request has been accepted while the network is proceeding as if the request has been rejected. Thus, a need exists for effective techniques for managing such transactions to prevent these and other types of transaction mismatches.

SUMMARY

A summary of sample aspects of the disclosure follows. In the discussion herein, any reference to the term aspects may refer to one or more aspects of the disclosure.

The disclosure relates in some aspects to managing transactions. For example, in the event an access terminal accepts a bearer context request, the access terminal may not immediately release the transaction identifier associated with that transaction (the bearer context request). In this way, in the event the access terminal receives a second bearer context request associated with that same transaction identifier (e.g., due to the accept message not reaching the network), the access terminal may send a second accept message in response to the second bearer context request.

Transaction identifiers may be managed in various ways in different implementations. In some implementations, a timer is started based on receipt of the first bearer context request (e.g., upon sending the accept message). Here, the second accept message may be sent only if the second bearer context request is received before the timer expires (or is stopped). In some implementations, the transaction identifiers for all successful transactions are stored in a queue (e.g., a FIFO). Here, the second accept message may be sent only if the transaction identifier is still in the queue when the second bearer context request is received.

In some aspects, a method of managing bearer transactions may involve receiving a first message comprising a bearer context request and including a particular transaction identifier, then sending a second message in response to the receipt of the first message, wherein the second message accepts the bearer context request. Subsequently, upon receipt of a third message comprising a retransmission of the bearer context request (e.g., including the same transaction identifier), a fourth message is sent to accept the retransmission of the bearer context request.

BRIEF DESCRIPTION OF THE DRAWINGS

These and other sample aspects of the disclosure will be described in the detailed description and the appended claims that follow, and in the accompanying drawings, wherein:

Figure 1:
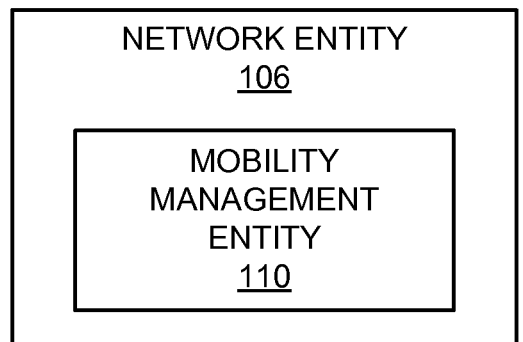
FIG. 1 is a simplified block diagram of several sample aspects of a communication system adapted to provide transaction management.
Figure 1:

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some other access point in the system 100 (not shown). Each of the access points may communicate with one or more network entities (represented, for convenience, by network entity 106) to facilitate wide area network connectivity.

A network entity may take various forms such as, for example, one or more radio and/or core network entities. Thus, in various implementations the network entity may represent functionality such as at least one of: network management (e.g., via an operations, administration, and maintenance (OAM) entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for the access terminals; and providing access control for access terminals. Also, two of more of these network entities may be co-located or distributed within the network.

In accordance with the teachings herein, the access terminal 102 includes a transaction manager 108 for managing transactions between the access terminal 102 and the network (e.g., a mobility management entity (MME) 110 in the network). For purposes of illustration, these and other aspects of the disclosure will be described in the context of an LTE system where access terminal (e.g., UE) initiated evolved packet system (EPS) session management procedures are employed to manage (e.g., activate and modify) bearers for access terminal applications. It should be appreciated, however, that the teachings herein may be applicable to, for example, various types of communication systems, various types of transactions, and various types of transaction identifiers.

In access terminal initiated EPS session management (ESM) procedures involving EPS bearer context activation or modification, misalignment may occur between EPS bearer context at the access terminal and EPS bearer context at the network (e.g., at an MME). For example, the access terminal may assign a procedure transaction identifier (PTI) to each transaction that the access terminal initiates. In addition, upon initiating a transaction, the access terminal may enter a procedure transaction pending state and send a corresponding ESM message to the network, whereby the ESM message includes the designated PTI.

The network includes this PTI in any messages the network sends to the access terminal relating to that access terminal initiated procedure transaction. For example, upon receipt of a bearer resource request including a particular PTI from an access terminal, the network may send a bearer context request including that PTI and bearer information to the access terminal. In response, the access terminal may send an accept message including that PTI to the network. The network may then activate or modify the appropriate EPS bearer context after successfully receiving the accept message from the access terminal.

When an access terminal accepts a network ESM request, the corresponding accept message may not be successfully delivered to the network in some cases (e.g., due to a lower layer transmission failure or some other reason). In these cases, the network may retransmit the ESM request, where the retransmitted ESM request includes the same PTI as the original ESM request. In accordance with conventional practice, however, the access terminal will have released that PTI upon accepting the first network ESM request. For example, in conjunction with accepting the first ESM request, the access terminal may switch from a procedure transaction pending state to a procedure transaction inactive state and release the PTI. Consequently, the access terminal may not recognize the PTI in the retransmitted ESM request and, as a result, the access terminal may reject the retransmitted ESM request (e.g., send a reject message with cause=PTI mismatch to the network).

Under these circumstances, there may be a misalignment between the EPS bearer context configurations at the access terminal and the network. For example, since the network was informed that the ESM request has been rejected, the network will not activate or modify the EPS bearer context. However, the access terminal may assume that the bearer context has been activated or modified since it accepted the ESM request. Consequently, the access terminal may attempt to use that bearer context.

In accordance with the teachings herein, an access terminal (e.g., the transaction manager 108) may not immediately release the PTI (e.g., may not free up the PTI for use with other transactions) in conjunction with acceptance of a request from the network. In addition, after acceptance of the request, the access terminal may maintain information indicating that the PTI is associated with this transaction. In this way, in the event the access terminal receives a retransmission of a request from the network including the same PTI, the access terminal is able to accept the retransmitted request.

In some implementations, the access terminal starts a timer in conjunction with transmission of the accept message (e.g., after transmitting the accept message). In the event a retransmission of the request is received before the timer expires, the access terminal processes the request (e.g., rather than rejecting it outright) in a similar manner as the original request. In particular, the access terminal may send an accept message in response to the retransmitted request.

In other implementations, the access terminal stores relevant information (e.g., the PTIs) of the last initiated procedures in a queue. In the event a retransmission of the request is received, the access terminal determines whether a corresponding PTI is still in the queue. If so, the access terminal processes the request in a similar manner as the original request (e.g., sends an accept message).

In other implementations, the access terminal maintains a current PTI, whereby the access terminal increments the current PTI whenever a new transaction is initiated. In the event a retransmission of the request is received, the access terminal determines whether the PTI of the retransmitted request is within a defined range of the current PTI. If so, the access terminal processes the request in a similar manner as the original request (e.g., sends an accept message).

With the above overview in mind, sample transaction management operations will now be described in more detail in conjunction with the flowcharts of FIGS. 2-8. For convenience, the operations of FIGS. 2-8 (or any other operations discussed or taught herein) may be described as being performed by specific components (e.g., the components depicted in FIGS. 1 and 9). It should be appreciated, however, that these operations may be performed by other types of components and may be performed using a different number of components. It also should be appreciated that one or more of the operations described herein may not be employed in a given implementation.

Figure 2:
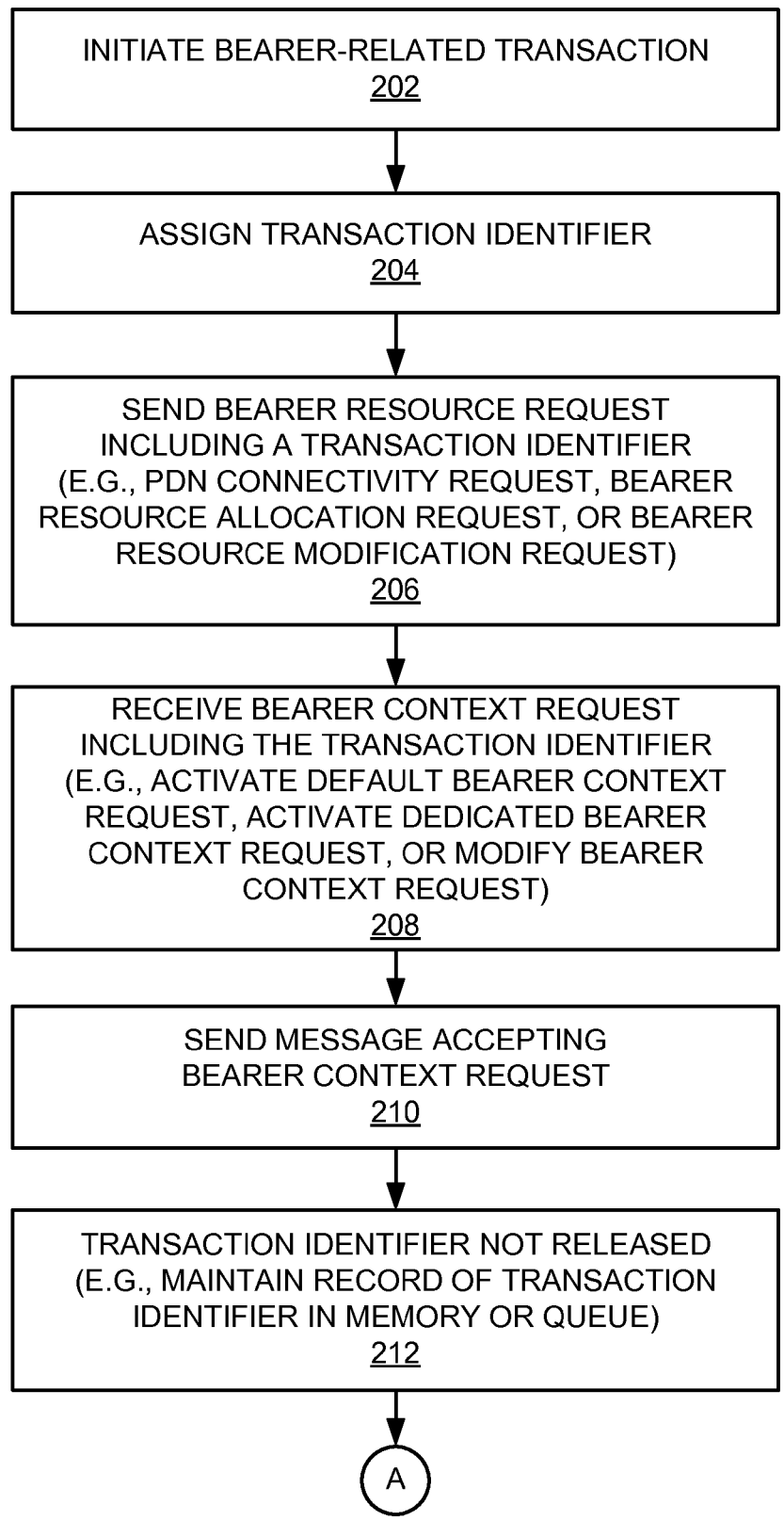
FIGS. 2 and 3 are a flowchart of several sample aspects of operations that may be performed in conjunction with accepting a retransmission of a bearer request.

Referring initially to FIG. 2, as represented by block 202, at some point in time an access terminal initiates a bearer-related transaction. For example, the access terminal may initiate a standalone PDN connectivity procedure, a bearer resource allocation procedure, or a bearer resource modification procedure.

In some aspects, a bearer defines a logical pipe that specifies how a flow of traffic between an access terminal and the network (e.g., a serving gateway or PDN gateway in the network) is to be handled by the network. For example, a particular bearer may be associated with a specific quality of service (QoS) to be applied to that traffic. Once a bearer is established, the access terminal and the network each maintain bearer context for the bearer. This bearer context includes information that may be used, for example, in conjunction with identifying and processing packets of a given traffic flow. In a typical implementation, bearer context includes a bearer identifier, packet filter information, and QoS information.

In some implementations, the access terminal may employ state-based procedure transactions. For example, in conjunction with initiation of a transaction, the access terminal may transition from a procedure transaction inactive state to a procedure transaction pending state.

As represented by block 204, in conjunction with the initiation of the transaction, the access terminal assigns a transaction identifier (referred to as a PTI in this example) to the transaction. For example, the access terminal may utilize a fixed number of PTIs, whereupon each new transaction is assigned a PTI that is not currently being used for any other transaction. In other words, the access terminal assigns a PTI that is different than the PTIs that are active. Except as noted herein, the PTI may be assigned to a given transaction until the transaction ends. After that the PTI may be released (e.g., made available to be subsequently reassigned to another transaction).

As represented by block 206, the access terminal sends a request message including the assigned PTI to the network (e.g., to an MME). In some aspects, this message may comprise a bearer resource request such as, for example, a PDN connectivity request, a bearer resource allocation request, or a bearer resource modification request.

As represented by block 208, the access terminal may subsequently receive a bearer context request message including the assigned PTI from the network as a result of sending the message at block 206. For example, the network (e.g., an MME) may initiate a default EPS bearer context activation procedure in response to a PDN connectivity request. In this case, the network may send an activate default EPS bearer context request including a corresponding EPS bearer identity to the access terminal. As another example, the network may initiate a dedicated EPS bearer context activation procedure or an EPS bearer context modification procedure in response to a bearer resource allocation or modification request, respectively. Here, the network may send an activate dedicated EPS bearer context request or a modify EPS bearer context request to the access terminal These messages also may include a corresponding EPS bearer identity.

As represented by block 210, the access terminal determines whether to accept the request received at block 208. Here, if the request is accepted, the access terminal sends an accept message to the network in response to this request. In conjunction with this operation, the access terminal may activate or modify the corresponding EPS bearer context.

In some implementations, the access terminal also may change its operational state based on the receipt of the request (e.g., based on the access terminal's acceptance of the request). For example, the access terminal may transition to a procedure transaction inactive state at this point. As discussed below, in other implementations the access terminal may change its operational state at a later point in time.

As represented by block 212, the access terminal does not release the PTI at this point in time. Rather, the access terminal maintains a record of the PTI in some manner so that the access terminal may properly respond to a retransmission of the request from the network as discussed below. For example, in some implementations the access terminal maintains a record of the PTI in a memory. In some implementations, the access terminal stores the PTI in a queue (e.g., a FIFO). The access terminal also may store other information associated with the transaction. This information may include, for example, the EPS bearer identity activated or modified by the transaction.

Figure 3:
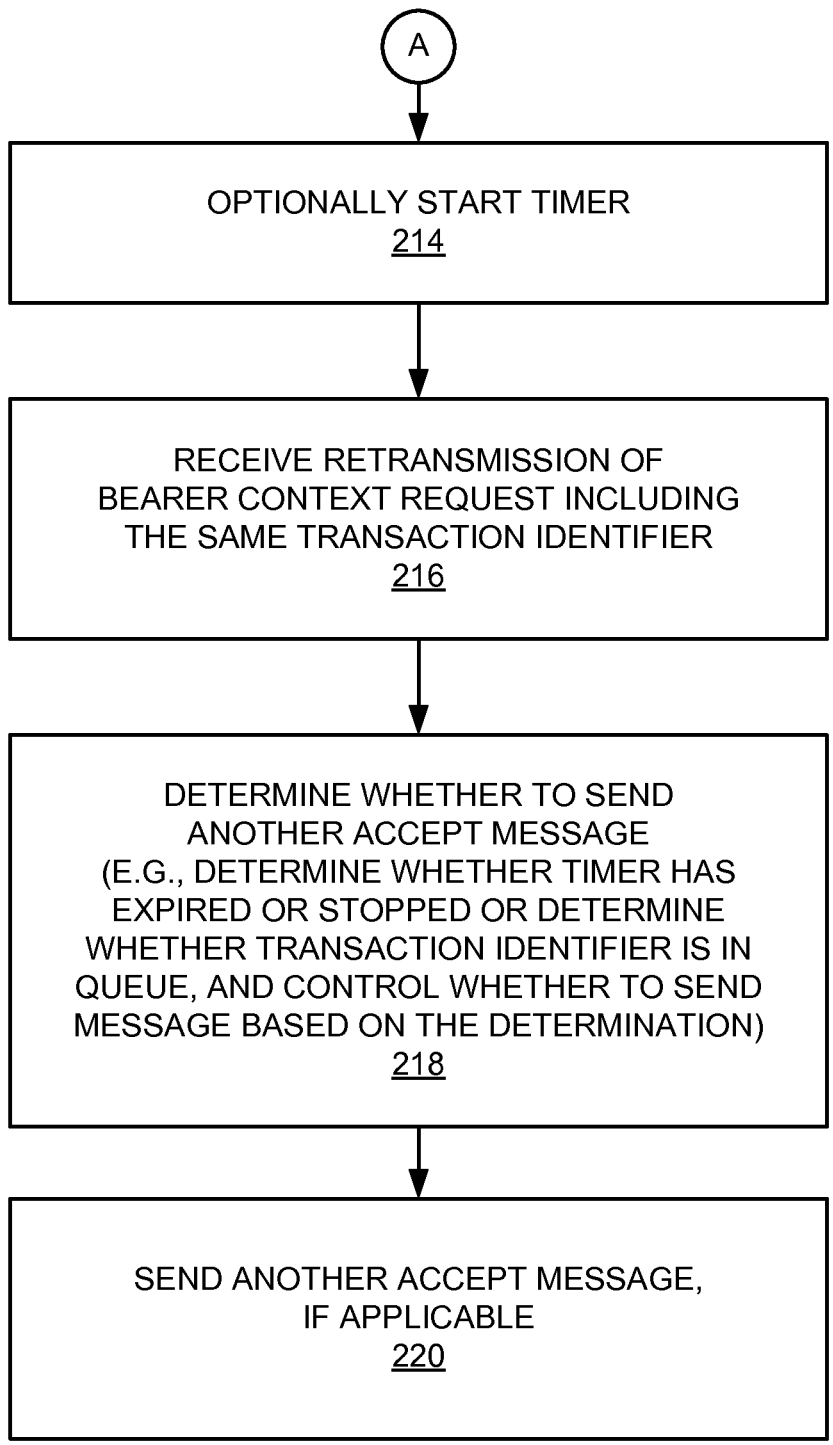

As represented by block 214 of FIG. 3, in some implementations the access terminal starts a timer based on the receipt of the request (e.g., based on the access terminal's acceptance of the request). For example, the timer may be started when the access terminal first receives an ESM request that includes a PTI that matches the PTI of a procedure that is in the procedure transaction pending state. As discussed below, in these implementations the access terminal uses the timer to determine whether to accept a subsequently received request that includes the same identifier as the first received request.

As represented by block 216, under certain circumstances, the network may re-transmit a request. For example, the network may start a timer upon sending a request (e.g., a bearer context request as discussed above at block 208). In the event the network does not receive a response to the request before the timer expires (e.g., due to a lower layer transmission failure, etc.), the network may retransmit the request. Here, the retransmitted request includes the same PTI as the original request.

In some aspects, the duration of the timer employed at the access terminal may be based on the duration of the timer employed in the network and the number of retransmissions performed by the network. For example, in an implementation where the network employs an 8 second timer and a maximum of 4 retransmissions, the access terminal timer may be configured to have a duration of at least 32 seconds.

As represented by block 218, upon receipt of a request, the access terminal determines whether to send an accept message. Here, the access terminal may determine whether the PTI included in the received request is the same as the PTI that was included in a previously received request (e.g., a recently received request). If so, this indicates that the received request is a retransmission. In this case, the access terminal may send another accept message. Various techniques may be employed to determine whether to send another accept message.

In implementations that employ a timer, the access terminal may determine whether the request was received before the timer expired or was stopped (i.e., the request was received while the timer was still running). If the request was received before the timer expired or was stopped, the access terminal may send an accept message to the network. Otherwise, the access terminal may send a reject message to the network (e.g., in the event the PTI included in the request is not associated with a currently active procedure).

In implementations that employ a queue, the access terminal may determine whether PTI was still in the queue when the request was received. If the PTI was still in the queue, the access terminal may send an accept message to the network. Otherwise, the access terminal may send a reject message to the network (e.g., in the event the PTI included in the request is not associated with a currently active procedure).

As represented by block 220, if applicable, the access terminal sends an accept message to the network (e.g., as discussed above). Accordingly, the access terminal may process a retransmission request in the same manner (e.g., sending an accept message) as the access terminal processes a first request from the network. Upon receipt of the accept message, the network may then activate or modify the designated bearer for subsequent use by the access terminal.

For purposes of illustration, FIGS. 2 and 3 illustrate different blocks for receiving a request (blocks 208 and 216) and sending an accept message (blocks 210 and 220). It practice, a common routine may be employed to process any incoming request messages and send any accept messages. Such a routine may thus be implemented to perform the operations described above. For example, the routine may determine whether a received request is a first request or a retransmission (e.g., based on whether the PTI is active, stored in a memory, stored in a queue, and so on) and then perform the appropriate operations.

Figure 4:
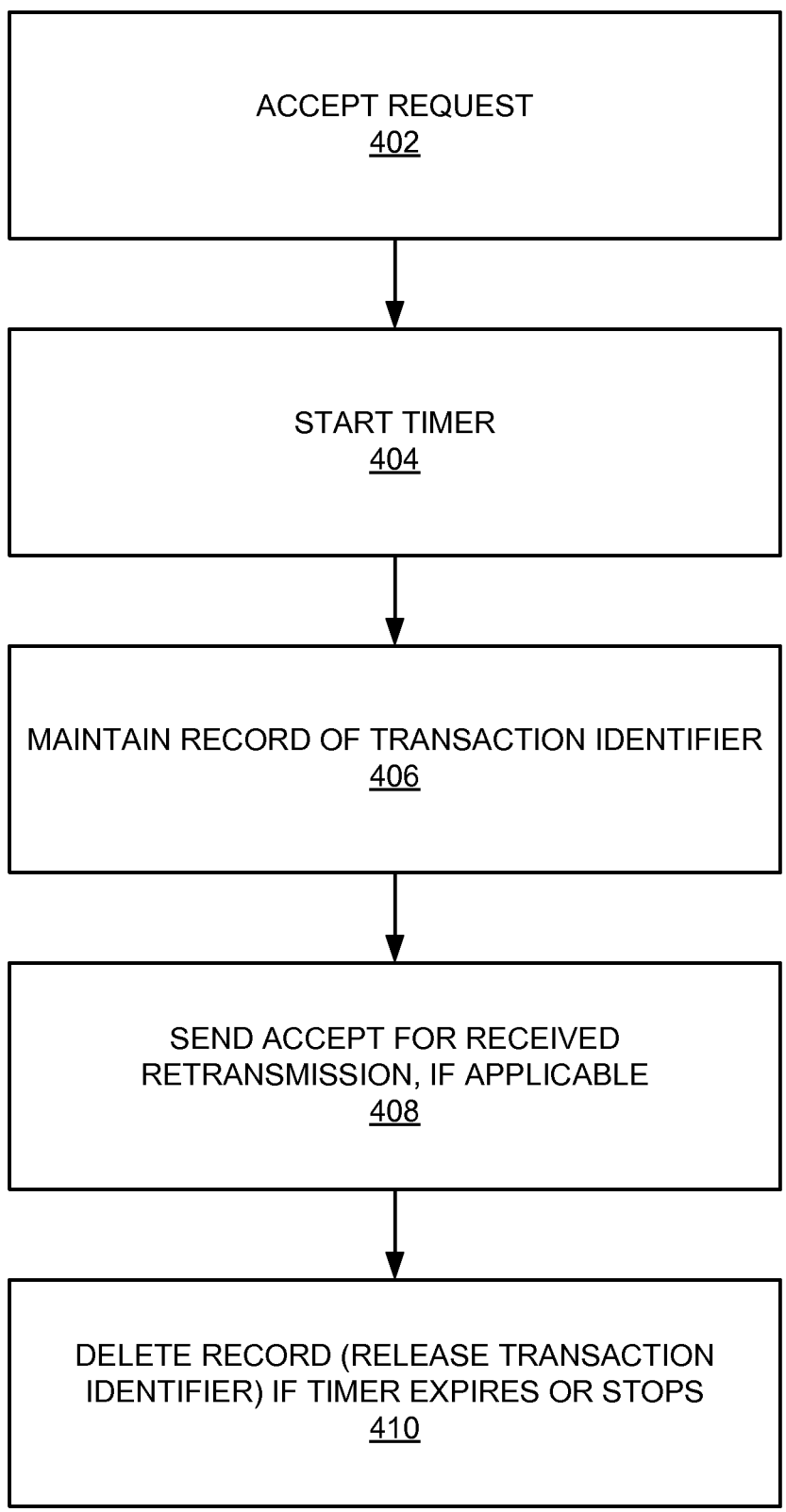
FIG. 4 is a flowchart of several sample aspects of operations that may be performed in conjunction with using a timer to delay the release of a transaction identifier.
Figure 5:
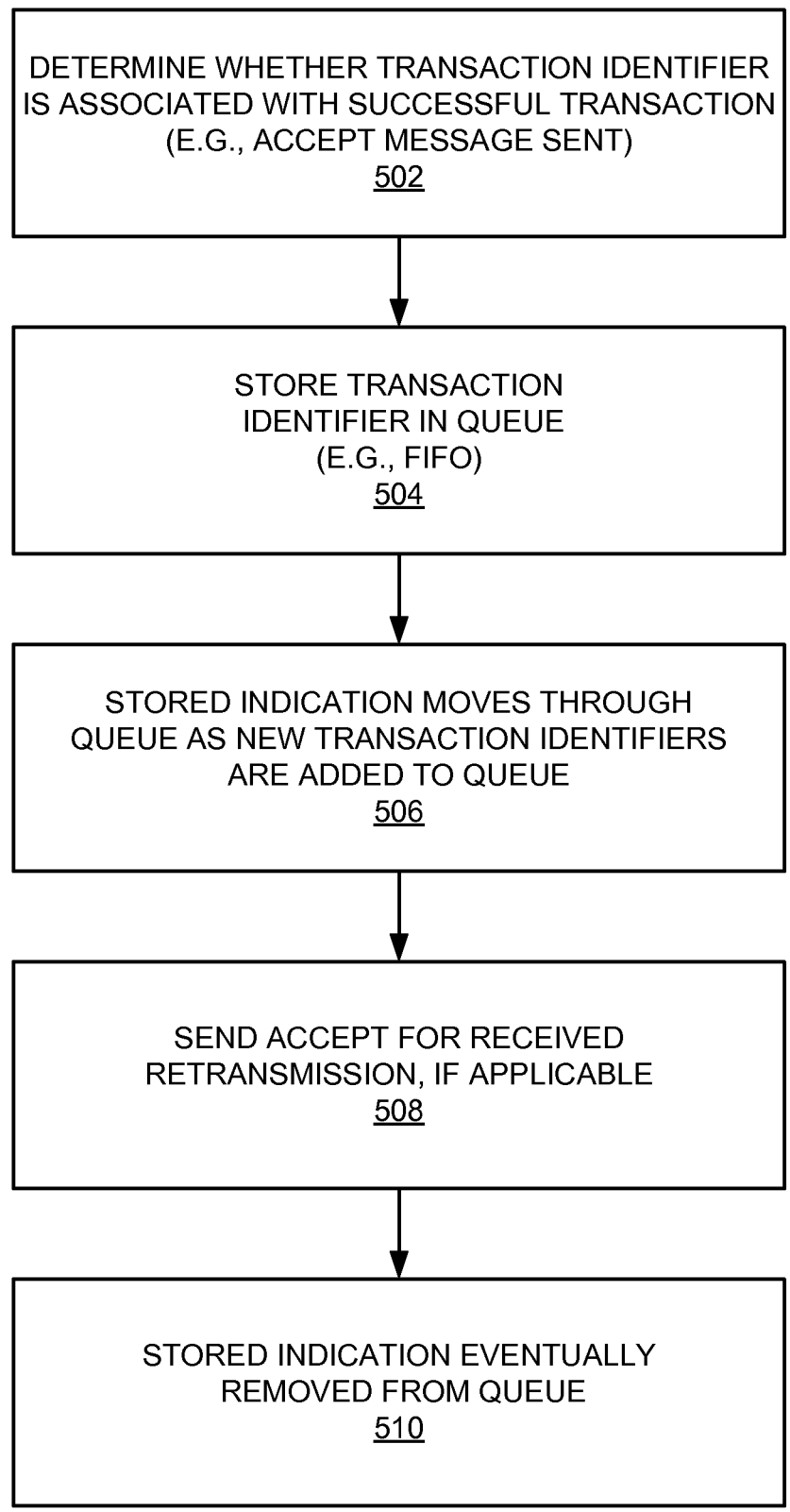
FIG. 5 is a flowchart of several sample aspects of operations that may be performed in conjunction with storing a transaction identifier in a queue.
Figure 6:
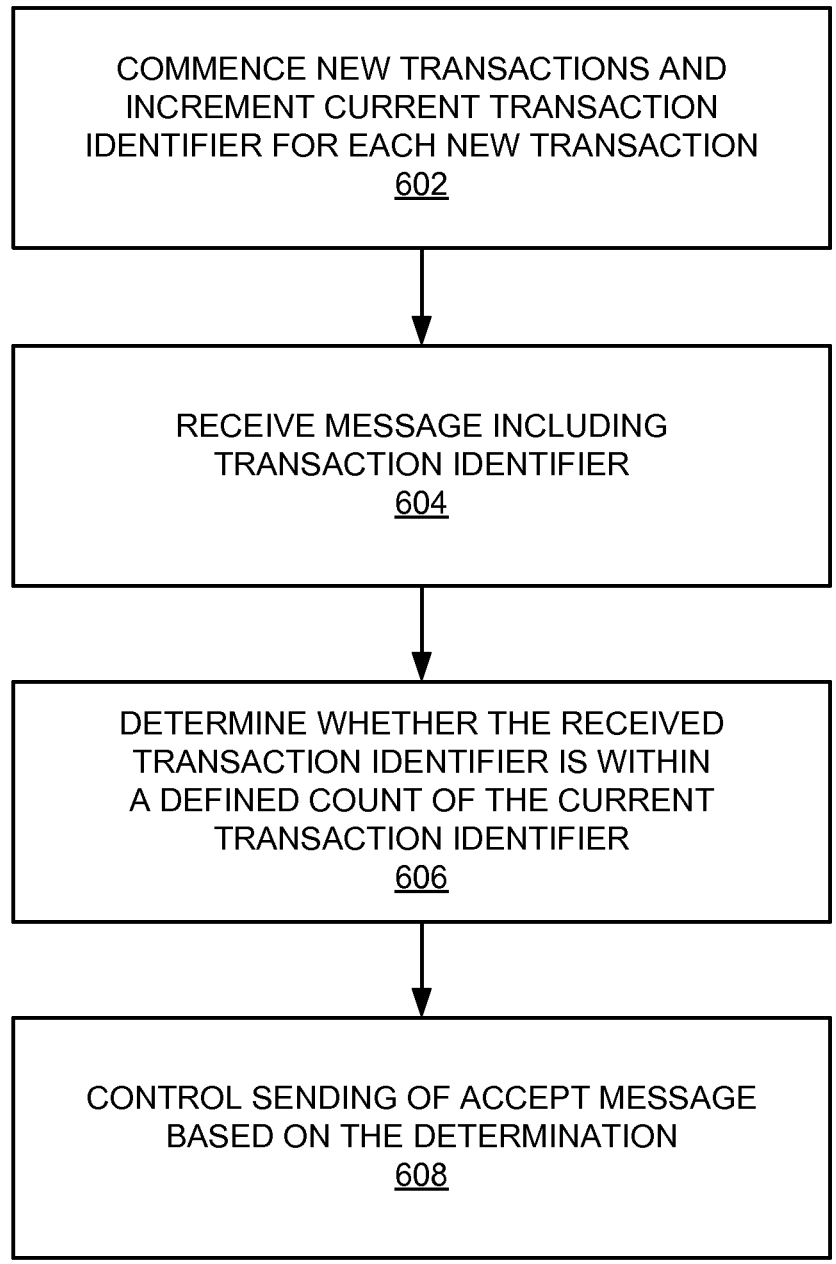
FIG. 6 is a flowchart of several sample aspects of operations that may be performed in conjunction with incrementing a current transaction identifier when starting each new transaction.

The PTI will eventually be released in a manner that depends on the particular implementation. FIGS. 4-6 describe these and other operations that may be performed in various implementations.

FIG. 4 describes sample operations that may be performed in implementations that employ a timer to determine whether to send an accept message. As discussed above, upon acceptance of a request from the network (e.g., after sending an accept message) at block 402, the access terminal starts a timer (block 404). In addition, the access terminal maintains a record of the corresponding PTI (block 406) and any other pertinent transaction information. Note that the access terminal may concurrently manage several transactions. Hence, a transaction record maintained by the access terminal may include several PTI entries and a separate timer may be started for each of these PTIs.

As represented by block 408, in the event the access terminal subsequently receives a request including a valid PTI from the network where the PTI does not match any active transactions (e.g., any transactions that have not sent an accept), the access terminal determines whether the PTI included in the request matches one of the PTIs in the transaction record. If so, the access terminal may process the request and send an accept message to the network.

As represented by block 410, a given PTI is released upon expiration of its corresponding timer. For example, the PTI may be removed from the transaction record. This PTI is then made available for a subsequent transaction initiated by the access terminal. In some implementations, the access terminal may transition to the state procedure transaction inactive upon expiration of the timer (e.g., rather than making this state transition at block 210 as discussed above).

FIG. 5 describes sample operations that may be performed in implementations that employ a queue. Here, the access terminal may store the last N (where N is a defined number) PTIs used in a successful transaction procedure. This may be done, for example, using a first-in first-out queue. Here, procedure transactions that were deactivated by abnormal cases are not considered successful and, hence, the corresponding PTIs are not stored in the queue. Also, in addition to not using any currently active PTIs for new procedure transactions, the access terminal will not use any of the PTIs that are in the queue for new procedure transactions.

The operations of FIG. 5 commence at block 502 where the access terminal determines whether a given PTI is associated with a successful transaction. For example, a transaction where an accept message has been sent to the network may be deemed to be a successful transaction. As represented by block 504, the access terminal then stores the associated PTI in the queue.

As represented by block 506, the PTI moves through the queue as new PTIs are added to the queue. For example, as the access terminal initiates new transactions with new PTIs, and those transaction are deemed successful, the access terminal may add these PTIs to the top of the queue. The PTIs that were already in the queue are thus moved down in the queue (with the lowest entries in the queue eventually being dropped from the queue).

As represented by block 508, in the event the access terminal subsequently receives a request including a valid PTI from the network the PTI does not match any active transactions (e.g., any transactions that have not sent an accept), the access terminal determines whether the PTI included in the request matches one of the PTIs in the queue. If so, the access terminal may process the request and send an accept message to the network.

As represented by block 510, a PTI may be released once the PTI is no longer in the queue. For example, once the FIFO fills up, the earliest entries placed in the FIFO will be shifted out of the FIFO as new entries are added to the FIFO.

FIG. 6 describes sample operations that may be performed in implementations that employ an incrementing PTI scheme. Here, the access terminal may increase the PTI to the next valid value every time a transaction is started (block 602). When the access terminal receives a request from the network with an assigned PTI that does not match any active transactions (block 604), the access terminal determines whether the PTI included in the request is within a defined count of the current PTI value (block 606). For example, the access terminal may determine whether the received PTI value is greater than the current (e.g., last used) PTI value minus a defined offset value. In other words, the access terminal may determine whether the received PTI value is within the last M (where M is a defined number) access terminal initiated ESM transactions. The access terminal may then control whether an accept message is sent based on this determination (block 608). For example, if the received PTI value is within a defined count of the current PTI value, the access terminal may send an accept message to the network. In the scheme of FIG. 6, a particular PTI may be released, in effect, once the current PTI value exceeds that particular PTI by the defined count.

In some implementations, an upper layer (e.g., a non-access stratum layer) that performs the session management procedures may receive indications (e.g., ACKs and/or NACKs) from a lower layer (e.g., a radio resource control (RRC) layer) that indicate whether messages were successfully transmitted by the lower layers. For example, an ACK message may indicate that a message was successfully transmitted from the access terminal to the network. Conversely, a NACK message may indicate that a message was not successfully transmitted from the access terminal to the network. In these implementations, the upper layer may provide some session management optimization based on the indications from the lower layers. Examples of such optimizations will now be described with reference to FIGS. 7 and 8.

Figure 7:
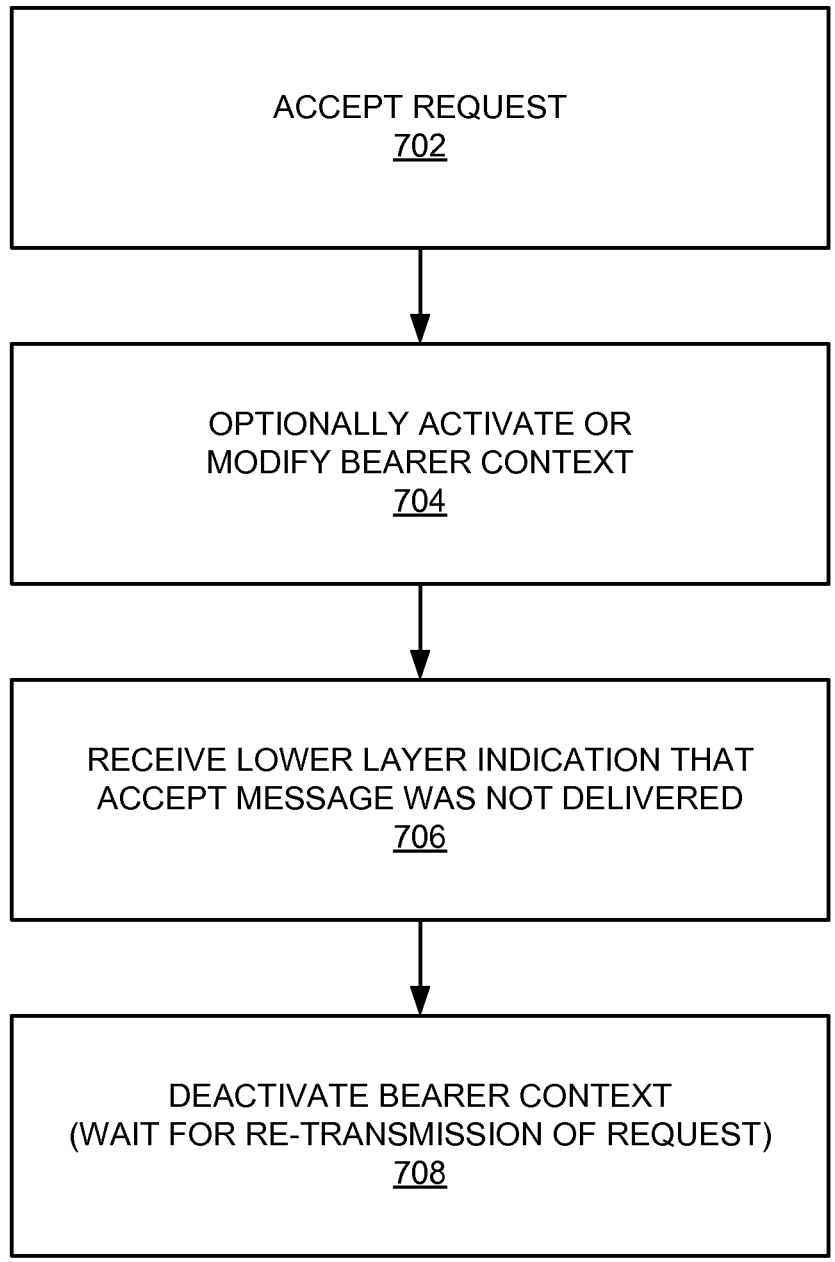
FIG. 7 is a flowchart of several sample aspects of operations that may be performed in conjunction with managing bearer context based on a received negative acknowledgement (NACK)

FIG. 7 illustrates sample operations that may be performed in cases where the upper layer receives NACKs from the lower layer. Upon acceptance of a request from the network (e.g., after sending an accept message) at block 702, the access terminal may optionally activate or modify the bearer context specified by the request (block 704). For example, as discussed herein, the access terminal may activate a bearer context after receiving an activate default (or dedicated) EPS bearer context request message from the network or the access terminal may modify a bearer context after receiving a modify EPS bearer context request message from the network.

As represented by block 706, at some later point in time, the upper layer may receive an indication from the lower layer that indicates that the accept message was not delivered to the network (e.g., the MME). In this case, the access terminal may deactivate the corresponding bearer context (block 708). The access terminal may then wait for a retransmission of the request from the network to activate or modify the bearer context. Alternatively, the access terminal may retransmit the accept message in response to the NACK. In this latter case, a timer may be employed for retransmission (and a maximum number of retransmissions defined).

Figure 8:
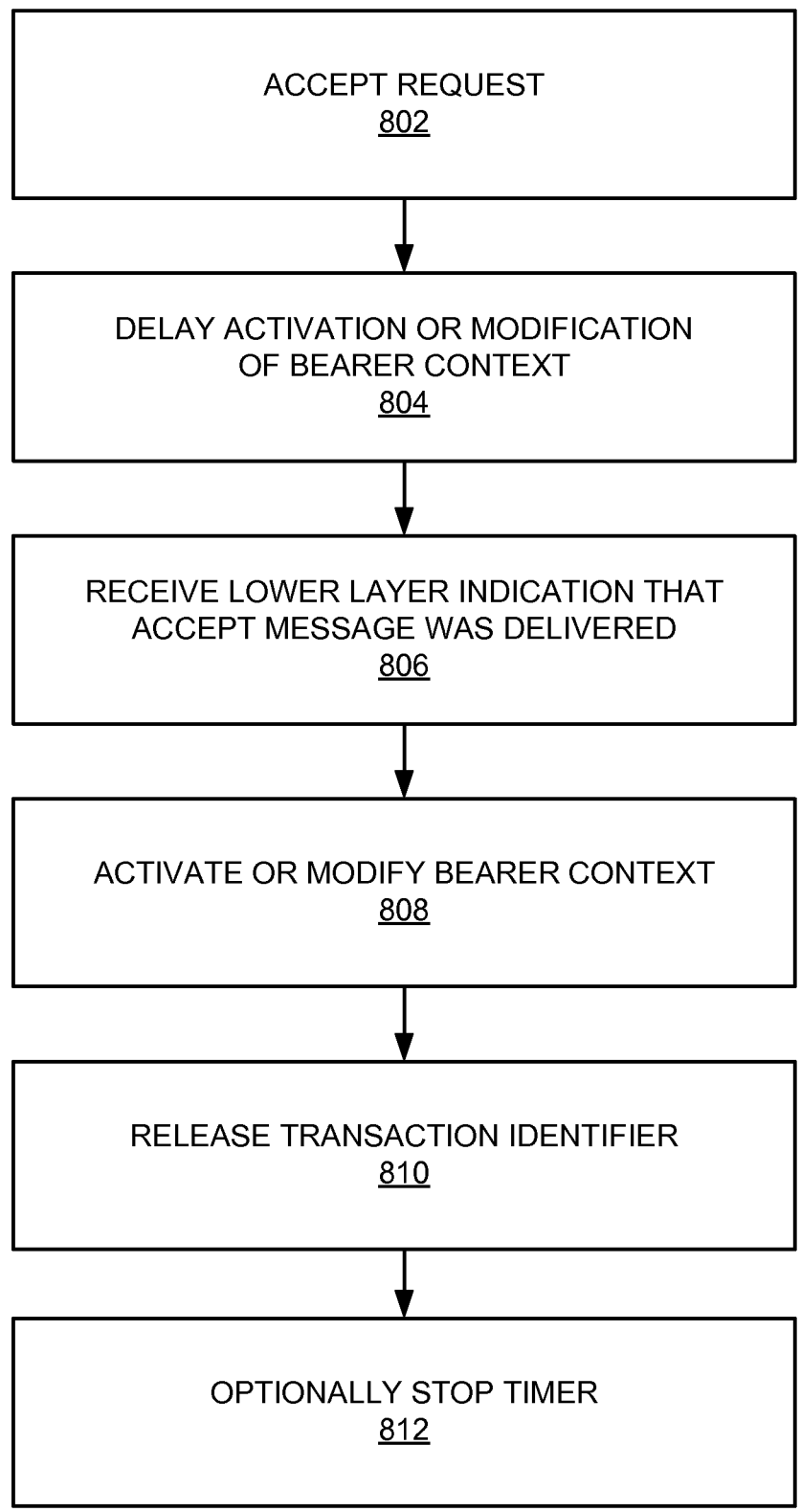
FIG. 8 is a flowchart of several sample aspects of operations that may be performed in conjunction with managing bearer context based on a received acknowledgement (ACK)

FIG. 8 illustrates sample operations that may be performed in cases where the upper layer receives ACKs from the lower layer. Upon acceptance of a request from the network (e.g., after sending an accept message) at block 802, the access terminal may optionally delay activation or modification of the bearer context specified by the request (block 804). At block 806, at some later point in time, the upper layer may receive an indication from the lower layer that indicates that the accept message was delivered to the network (e.g., the MME). In this case, the access terminal may activate or modify the corresponding bearer context as a result of receiving the ACK (block 808). In addition, the access terminal may release the corresponding PTI (and optionally move to the procedure transaction inactive state) as a result of receiving the ACK (block 810). Also, in implementations that employ a timer for determining whether to send an accept message, the access terminal may stop the timer as a result of receiving the ACK (block 812).

Various modifications may be made to the above-described concepts in accordance with the teachings herein. For example, once a possible retransmission is recognized, the access terminal may determine whether the bearer identity in a received EPS request matches an active EPS bearer context. If so, the access terminal may send an accept message. If not, the access terminal may reject the received EPS request. Thus, the bearer context information may be used instead of the PTI.

As another example, in some implementations the access terminal may employ an additional state in conjunction with the use of the timer as described herein. For example, after sending an accept message, the access terminal may transition to a procedure transaction responded state from the procedure transaction pending state. Upon entering this state, the access terminal may start the timer. If the ESM request is received from the network with a matching PTI, the access terminal may then process the request in the same manner as it processed the first ESM request. Accordingly, in some aspects, the access terminal may process requests from the network in the same manner (e.g., sending an accept message and activating or modifying the specified bearer context) irrespective of whether the access terminal is in the procedure transaction responded state or the procedure transaction pending state. The access terminal transitions to the procedure transaction inactive state upon expiration of the timer. Here, a procedure in the procedure transaction pending state or the procedure transaction responded state may be considered as an active procedure.

Figure 9:
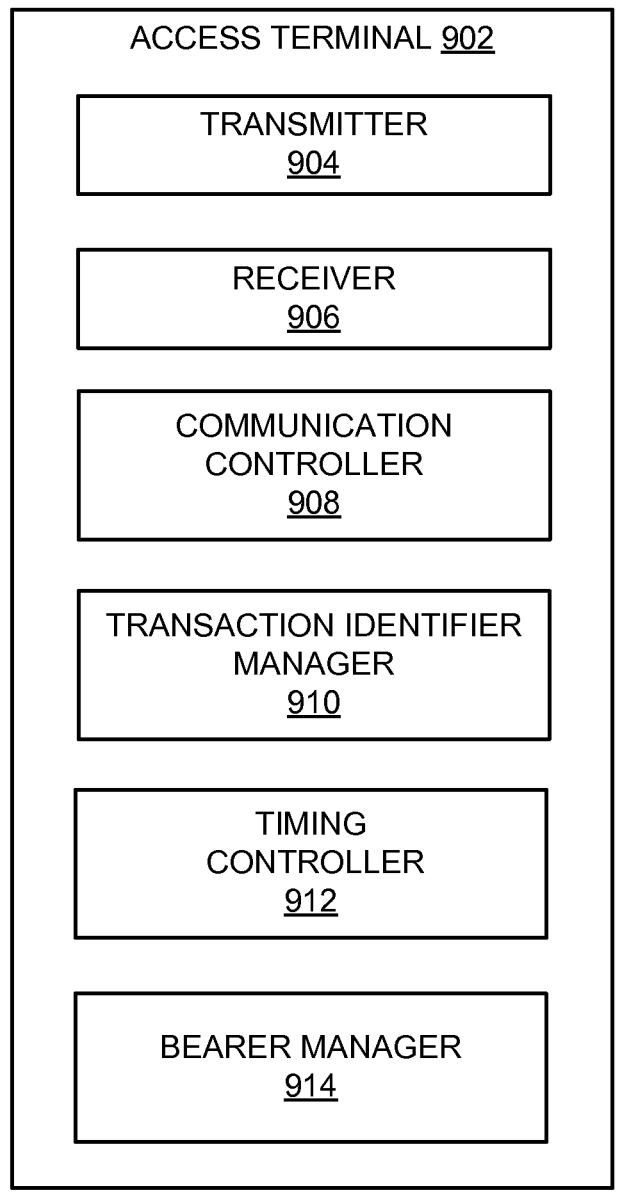
FIG. 9 is a simplified block diagram of several sample aspects of components that may be employed in communication nodes.

FIG. 9 illustrates several sample components that may be incorporated into nodes such as an access terminal 902 to perform transaction management operations as taught herein. The described components also may be incorporated into other nodes in a communication system. For example, other nodes in a system may include components similar to those described for the access terminal 902 to provide similar functionality. A given node may contain one or more of the described components. For example, an access terminal may contain multiple transceiver (e.g., transmitter and receiver) components that enable the access terminal to operate on multiple frequencies and/or communicate via different technologies.

As shown in FIG. 9, the access terminal 902 includes one or more transmitters (represented by transmitter 904) and receivers (represented by receiver 906) for communicating with other nodes via a wireless medium and/or a wire-based medium. For example, the transmitter 904 may send signals (e.g., messages and requests) to other nodes in the system and the receiver 906 may receive signals from other nodes in the system.

The access terminal 902 also includes other components that may be used in conjunction with transaction management operations as taught herein. For example, the access terminal 902 may include a communication controller 908 for managing communication with other nodes (e.g., one or more of sending and receiving requests, messages, and indications, controlling whether a message is to be sent) and for providing other related functionality as taught herein. In some aspects, the communication controller 908 may provide functionality to facilitate inter-process communication (e.g., facilitating communication between lower layers and upper layers). In some aspects, the functionality of the communication controller 908 and one or more of the transmitter 904 and the receiver 906 may be performed by a common entity. In addition, the access terminal 902 may include a transaction identifier manager 910 (e.g., corresponding at least in part to transaction manager 108 of FIG. 1) for managing the generation and use of transaction identifiers (e.g., one or more of maintaining records of transaction identifiers, deleting these records, storing transaction identifiers, determining whether a transaction identifier is in a queue, determining whether a transaction identifier is associated with a successful transaction, controlling whether transaction identifiers are stored in a queue, maintaining a current transaction identifier, determining whether a transaction identifier is within a defined count of the current transaction identifier, or releasing a transaction identifier) and for providing other related functionality as taught herein. The access terminal 902 may include a timing controller 912 (e.g., corresponding at least in part to transaction manager 108 of FIG. 1) for performing timing-related functions (e.g., one or more of providing a timer, starting a timer, or stopping a timer) and for providing other related functionality as taught herein. The access terminal 902 may include a bearer manager 814 for performing bearer-related functions (e.g., one or more of deactivating bearer context, or delaying activation or modification of bearer context) and for providing other related functionality as taught herein.

For convenience, the access terminal 902 is shown in FIG. 9 as including components that may be used in the various examples described herein. In practice, one or more of the illustrated components may be implemented in different ways in different implementations. As an example, the access terminal 902 may have different functionality and/or operate in a different manner (e.g., the maintaining of transaction identifiers is performed in a different manner) in the implementation of FIG. 5 as compared to the implementation of FIG. 6.

In some implementations the components of FIG. 9 may be implemented in one or more processors (e.g., that uses and/or incorporates data memory for storing information or code used by the processor(s) to provide this functionality). For example, some or all of the functionality of blocks 904-914 may be implemented by a processor or processors of an access terminal and data memory of the access terminal (e.g., by execution of appropriate code and/or by appropriate configuration of processor components).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
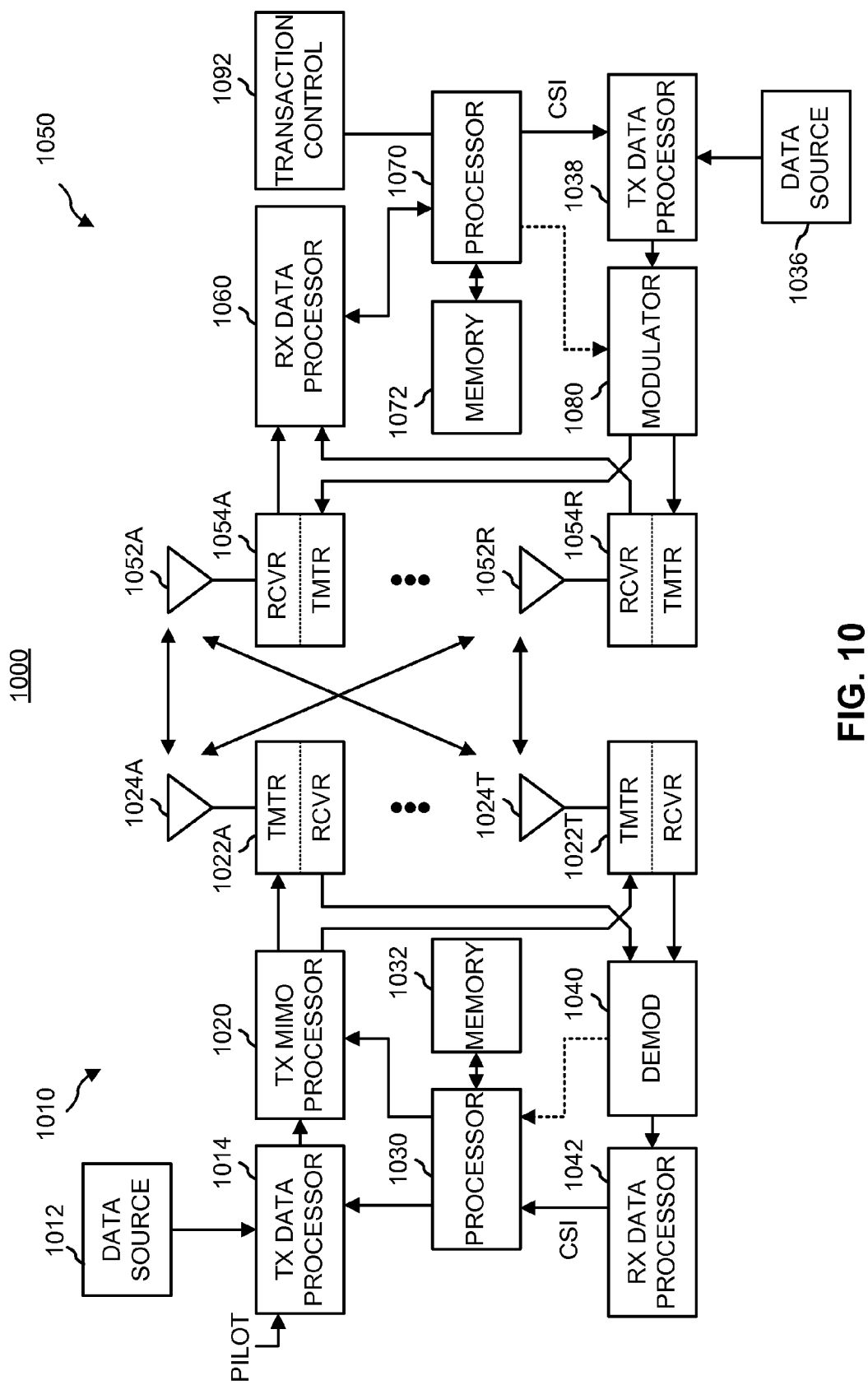
FIG. 10 is a simplified block diagram of several sample aspects of communication components.

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform transaction control operations as taught herein. For example, a transaction control component 1092 may cooperate with the processor 1070 and/or other components of the device 1050 to manage transactions sent and received via another device (e.g., device 1010). It should be appreciated that for each device 1010 and 1050 the functionality of two or more of the described components may be provided by a single component. For example, a single processing component may provide the functionality of the transaction control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 11:
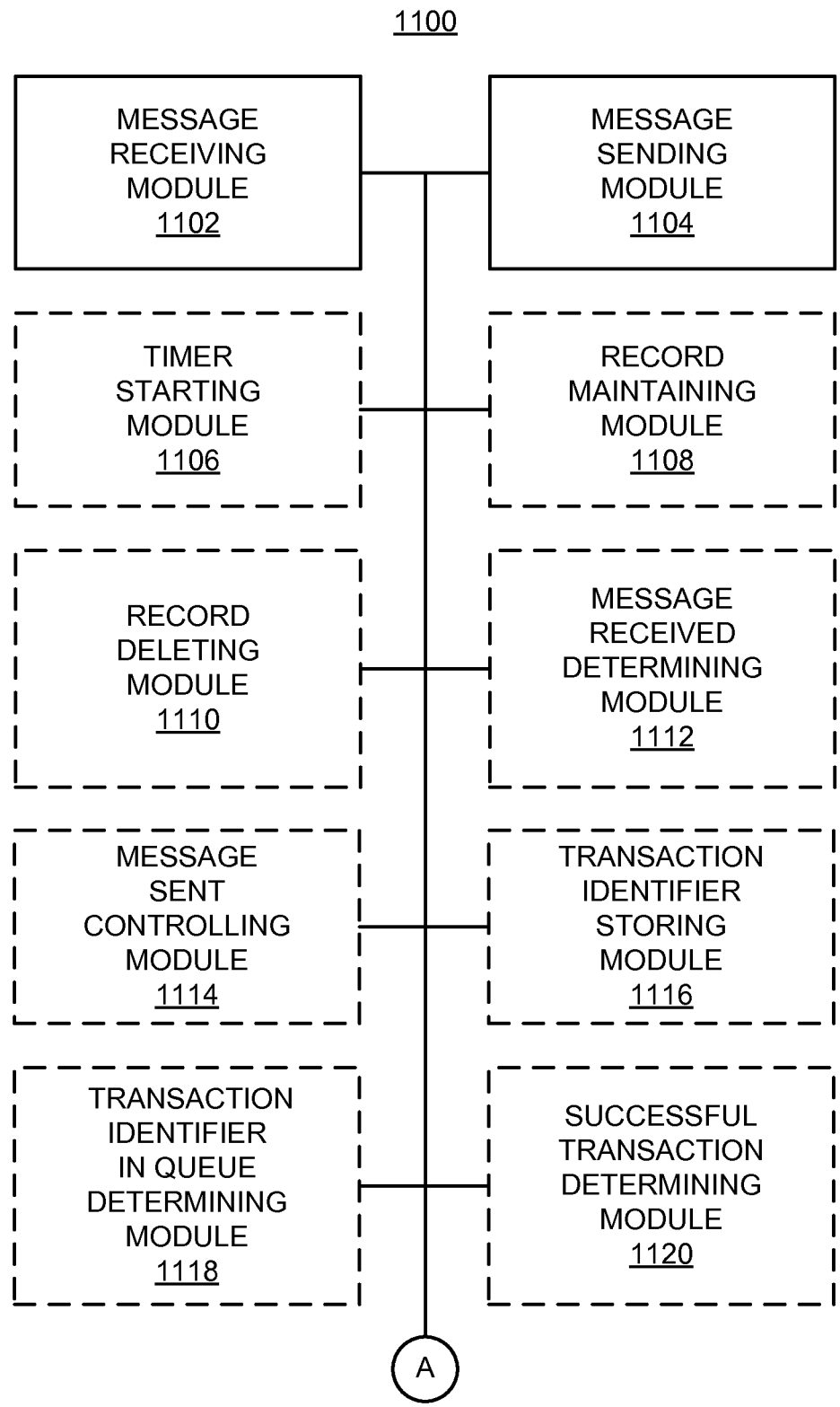
FIGS. 11-13 are simplified block diagrams of several sample aspects of apparatuses configured to provide transaction management as taught herein.
Figure 12:
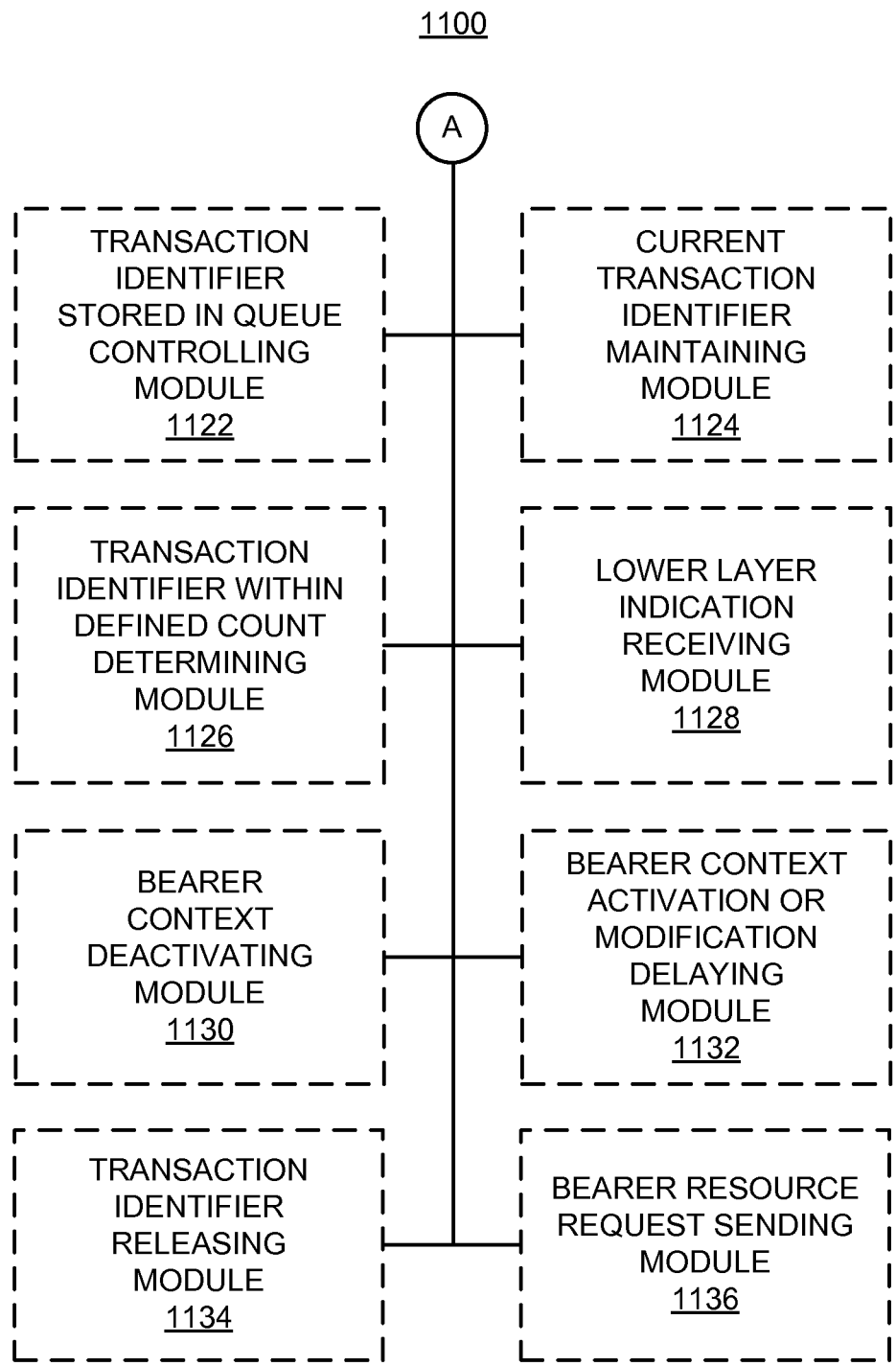
Figure 13:
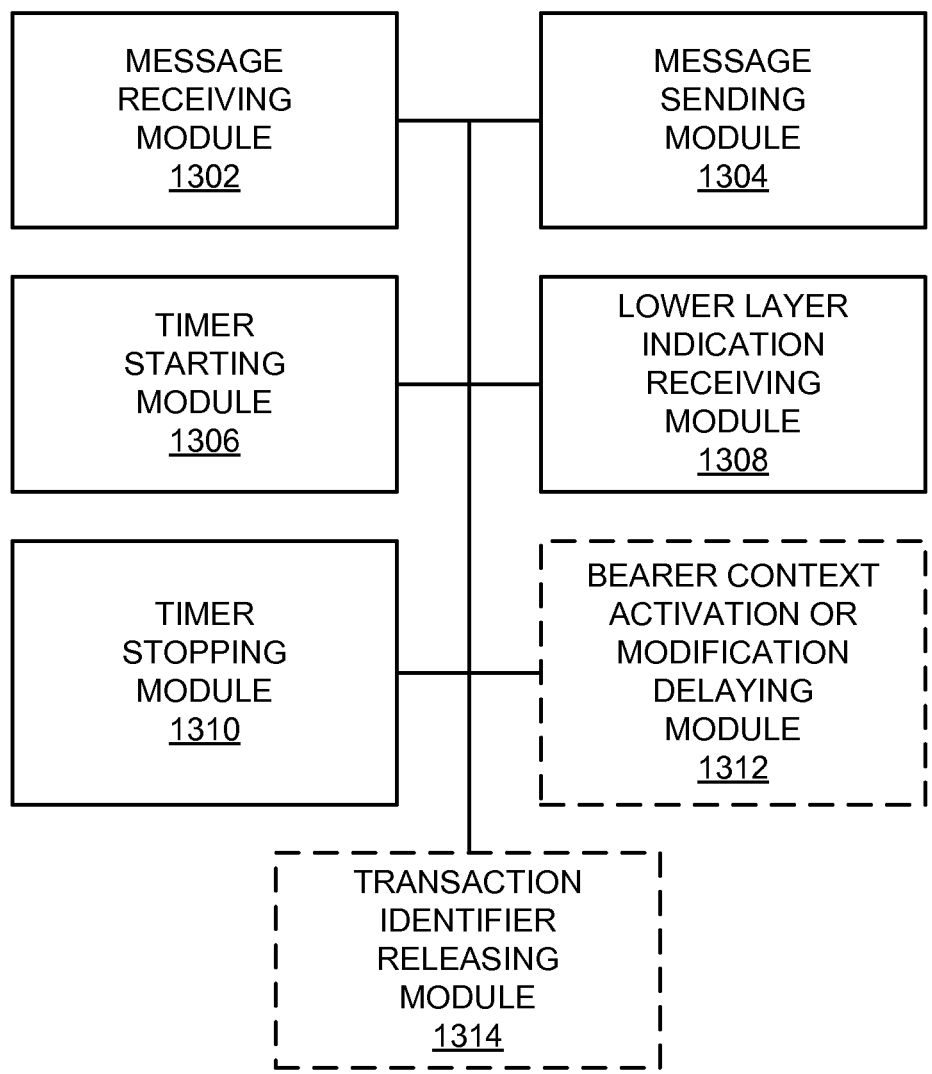

The functionality described herein (e.g., with regard to one or more of the accompanying figures) may correspond in some aspects to similarly designated "means for" functionality in the appended claims. Referring to FIGS. 11-13, apparatuses 1100 and 1300 are represented as a series of interrelated functional modules. Here, a message receiving module 1102 may correspond at least in some aspects to, for example, a receiver as discussed herein. A message sending module 1104 may correspond at least in some aspects to, for example, a transmitter as discussed herein. A timer starting module 1106 may correspond at least in some aspects to, for example, a timing controller as discussed herein. A record maintaining module 1108 may correspond at least in some aspects to, for example, a transaction identifier manager as discussed herein. A record deleting module 1110 may correspond at least in some aspects to, for example, a transaction identifier manager as discussed herein. A message received determining module 1112 may correspond at least in some aspects to, for example, a timing controller as discussed herein. A message sent controlling module 1114 may correspond at least in some aspects to, for example, a communication controller as discussed herein. A transaction identifier storing module 1116 may correspond at least in some aspects to, for example, a transaction identifier manager as discussed herein. A transaction identifier in queue determining module 1118 may correspond at least in some aspects to, for example, a transaction identifier manager as discussed herein. A successful transaction determining module 1120 may correspond at least in some aspects to, for example, a transaction identifier manager as discussed herein. A transaction identifier stored in queue controlling module 1122 may correspond at least in some aspects to, for example, a transaction identifier manager as discussed herein. A current transaction identifier maintaining module 1124 may correspond at least in some aspects to, for example, a transaction identifier manager as discussed herein. A transaction identifier within defined count determining module 1126 may correspond at least in some aspects to, for example, a transaction identifier manager as discussed herein. A lower layer indication receiving module 1128 may correspond at least in some aspects to, for example, a communication controller as discussed herein. A bearer context deactivating module 1130 may correspond at least in some aspects to, for example, a bearer manager as discussed herein. A bearer context activation or modification delaying module 1132 may correspond at least in some aspects to, for example, a bearer manager as discussed herein. A transaction identifier releasing module 1134 may correspond at least in some aspects to, for example, a transaction identifier manager as discussed herein. A bearer resource sending module 1136 may correspond at least in some aspects to, for example, a transmitter as discussed herein.

A message receiving module 1302 may correspond at least in some aspects to, for example, a receiver as discussed herein. A message sending module 1304 may correspond at least in some aspects to, for example, a transmitter as discussed herein. A timer starting module 1306 may correspond at least in some aspects to, for example, a timing controller as discussed herein. A lower layer indication receiving module 1308 may correspond at least in some aspects to, for example, a communication controller as discussed herein. A timer stopping module 1310 may correspond at least in some aspects to, for example, a timing controller as discussed herein. A bearer context activation or modification delaying module 1312 may correspond at least in some aspects to, for example, a bearer manager as discussed herein. A transaction identifier releasing module 1314 may correspond at least in some aspects to, for example, a transaction identifier manager as discussed herein.

The functionality of the modules of FIGS. 11-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 11-13 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving, by an access terminal, a first evolved packet system (EPS) session management (ESM) message, wherein the first ESM message comprises an EPS bearer context request and a transaction identifier;
   sending, by the access terminal, a second ESM message in response to the receipt of the first ESM message, wherein the second ESM message accepts the EPS bearer context request, and wherein the access terminal does not immediately release the transaction identifier in conjunction with accepting the EPS bearer context request;
   receiving, by the access terminal, a third ESM message, wherein the third ESM message comprises a retransmission of the EPS bearer context request and the transaction identifier; and
   sending, by the access terminal, a fourth ESM message in response to the receipt of the third ESM message, wherein the fourth ESM message accepts the EPS bearer context request.

2. The method of claim 1, further comprising:
   starting a timer based on the receipt of the first ESM message;
   maintaining a record of the transaction identifier after sending the second ESM message; and
   deleting the record if the timer expires or stops.

3. The method of claim 1, further comprising:
   starting a timer based on the receipt of the first ESM message;
   determining whether the third ESM message is received before the timer expires or stops; and
   controlling whether the fourth ESM message is sent based on the determination.

4. The method of claim 1, further comprising:
   storing the transaction identifier in a queue;
   determining whether the transaction identifier is in the queue when the third ESM message is received; and
   controlling whether the fourth ESM message is sent based on the determination.

5. The method of claim 4, further comprising:
   determining whether the transaction identifier is associated with a successful transaction; and
   controlling whether the transaction identifier is stored in the queue based on the determination of whether the transaction identifier is associated with a successful transaction.

6. The method of claim 4, wherein the queue comprises a first-in first-out memory.

7. The method of claim 1, further comprising:
   maintaining a current transaction identifier by incrementing the current transaction identifier every time a new transaction is commenced; and
   determining whether the transaction identifier included in the third ESM message is within a defined count of the current transaction identifier when the third ESM message is received; and
   controlling whether the fourth ESM message is sent based on the determination.

8. The method of claim 1, further comprising sending a bearer resource request, wherein:
   the bearer resource request includes the transaction identifier; and
   the first ESM message is received as a result of sending the bearer resource request.

9. The method of claim 8, wherein:
the bearer resource request comprises a packet data network connectivity request, a bearer resource allocation request, or a bearer resource modification request; and
the first ESM message comprises an activate default EPS bearer context request, an activate dedicated EPS bearer context request, or a modify EPS bearer context request.

10. The method of claim 1, further comprising:
receiving a lower layer indication that the second ESM message was not delivered; and
deactivating an EPS bearer context associated with the EPS bearer context request as a result of the receipt of the lower layer indication.

11. The method of claim 1, further comprising delaying activation or modification of an EPS bearer context associated with the EPS bearer context request until receipt of a lower layer indication that the second ESM message was delivered.

12. The method of claim 1, further comprising:
receiving a lower layer indication that the second ESM message was delivered; and
releasing the transaction identifier as a result of the receipt of the lower layer indication.

13. An access terminal, comprising:
a receiver configured to receive a first evolved packet system (EPS) session management (ESM) message, wherein the first ESM message comprises an EPS bearer context request and a transaction identifier; and
a transmitter configured to send a second ESM message that accepts the EPS bearer context request in response to the receipt of the first ESM message, wherein the access terminal does not immediately release the transaction identifier in conjunction with accepting the EPS bearer context request, and wherein:
the receiver is further configured to receive a third ESM message that comprises a retransmission of the EPS bearer context request and the transaction identifier, and
the transmitter is further configured to send a fourth ESM message that accepts the EPS bearer context request in response to the receipt of the third ESM message.

14. The access terminal of claim 13, further comprising:
a timing controller configured to start a timer based on the receipt of the first ESM message; and
a transaction identifier manager configured to maintain a record of the transaction identifier after sending the second ESM message, and further configured to delete the record if the timer expires or stops.

15. The access terminal of claim 13, further comprising:
a timing controller configured to start a timer based on the receipt of the first ESM message, and further configured to determine whether the third ESM message is received before the timer expires or stops; and
a communication controller configured to control whether the fourth ESM message is sent based on the determination.

16. The access terminal of claim 13, further comprising:
a transaction identifier manager configured to store the transaction identifier in a queue, and further configured to determine whether the transaction identifier is in the queue when the third ESM message is received; and
a communication controller configured to control whether the fourth ESM message is sent based on the determination.

17. The access terminal of claim 16, further comprising a transaction identifier manager configured to:
determine whether the transaction identifier is associated with a successful transaction; and
control whether the transaction identifier is stored in the queue based on the determination of whether the transaction identifier is associated with a successful transaction.

18. The access terminal of claim 16, wherein the queue comprises a first-in first-out memory.

19. The access terminal of claim 13, further comprising:
a transaction identifier manager configured to maintain a current transaction identifier by incrementing the current transaction identifier every time a new transaction is commenced, and further configured to determine whether the transaction identifier included in the third ESM message is within a defined count of the current transaction identifier when the third ESM message is received; and
a communication controller configured to control whether the fourth ESM message is sent based on the determination.

20. The access terminal of claim 13, wherein:
the transmitter is further configured to send a bearer resource request;
the bearer resource request includes the transaction identifier; and
the first ESM message is received as a result of sending the bearer resource request.

21. The access terminal of claim 20, wherein:
the bearer resource request comprises a packet data network connectivity request, a bearer resource allocation request, or a bearer resource modification request; and
the first ESM message comprises an activate default EPS bearer context request, an activate dedicated EPS bearer context request, or a modify EPS bearer context request.

22. The access terminal of claim 13, further comprising:
a communication controller configured to receive a lower layer indication that the second ESM message was not delivered; and
a bearer manager configured to deactivate an EPS bearer context associated with the EPS bearer context request as a result of the receipt of the lower layer indication.

23. The access terminal of claim 13, further comprising a bearer manager configured to delay activation or modification of an EPS bearer context associated with the EPS bearer context request until receipt of a lower layer indication that the second ESM message was delivered.

24. The access terminal of claim 13, further comprising:
a communication controller configured to receive a lower layer indication that the second ESM message was delivered; and
a transaction identifier manager configured to release the transaction identifier as a result of the receipt of the lower layer indication.

25. An access terminal, comprising:
means for receiving a first evolved packet system (EPS) session management (ESM) message, wherein the first ESM message comprises an EPS bearer context request and a transaction identifier;
means for sending a second ESM message in response to the receipt of the first ESM message, wherein the second ESM message accepts the EPS bearer context request, and wherein the access terminal does not immediately release the transaction identifier in conjunction with accepting the EPS bearer context request;
means for receiving a third ESM message, wherein the third ESM message comprises a retransmission of the EPS bearer context request and the transaction identifier; and means for sending a fourth ESM message in response to the receipt of the third ESM message, wherein the fourth ESM message accepts the EPS bearer context request.

26. The access terminal of claim 25, further comprising:
means for starting a timer based on the receipt of the first ESM message;
means for maintaining a record of the transaction identifier after sending the second ESM message; and
means for deleting the record if the timer expires or stops.

27. The access terminal of claim 25, further comprising:
means for starting a timer based on the receipt of the first ESM message;
means for determining whether the third ESM message is received before the timer expires or stops; and
means for controlling whether the fourth ESM message is sent based on the determination.

28. The access terminal of claim 25, further comprising:
means for storing the transaction identifier in a queue;
means for determining whether the transaction identifier is in the queue when the third ESM message is received; and
means for controlling whether the fourth ESM message is sent based on the determination.

29. The access terminal of claim 28, further comprising:
means for determining whether the transaction identifier is associated with a successful transaction; and
means for controlling whether the transaction identifier is stored in the queue based on the determination of whether the transaction identifier is associated with a successful transaction.

30. The access terminal of claim 28, wherein the queue comprises a first-in first-out memory.

31. The access terminal of claim 25, further comprising:
means for maintaining a current transaction identifier by incrementing the current transaction identifier every time a new transaction is commenced;
means for determining whether the transaction identifier included in the third ESM message is within a defined count of the current transaction identifier when the third ESM message is received; and
means for controlling whether the fourth ESM message is sent based on the determination.

32. The access terminal of claim 25, further comprising means for sending a bearer resource request, wherein:
the bearer resource request includes the transaction identifier; and
the first ESM message is received as a result of sending the bearer resource request.

33. The access terminal of claim 32, wherein:
the bearer resource request comprises a packet data network connectivity request, a bearer resource allocation request, or a bearer resource modification request; and
the first ESM message comprises an activate default EPS bearer context request, an activate dedicated EPS bearer context request, or a modify EPS bearer context request.

34. The access terminal of claim 25, further comprising:
means for receiving a lower layer indication that the second ESM message was not delivered; and
means for deactivating an EPS bearer context associated with the EPS bearer context request as a result of the receipt of the lower layer indication.

35. The access terminal of claim 25, further comprising means for delaying activation or modification of an EPS bearer context associated with the EPS bearer context request until receipt of a lower layer indication that the second ESM message was delivered.

36. The access terminal of claim 25, further comprising:
means for receiving a lower layer indication that the second ESM message was delivered; and
means for releasing the transaction identifier as a result of the receipt of the lower layer indication.

37. A non-transitory computer-readable medium comprising code for causing a computer to:
receive, by an access terminal, a first evolved packet system (EPS) session management (ESM) message, wherein the first ESM message comprises an EPS bearer context request and a transaction identifier;
send, by the access terminal, a second ESM message in response to the receipt of the first ESM message, wherein the second ESM message accepts the EPS bearer context request, and wherein the access terminal does not immediately release the transaction identifier in conjunction with accepting the EPS bearer context request;
receive, by the access terminal, a third ESM message, wherein the third ESM message comprises a retransmission of the EPS bearer context request and the transaction identifier; and
send, by the access terminal, a fourth ESM message in response to the receipt of the third ESM message, wherein the fourth ESM message accepts the EPS bearer context request.

38. The non-transitory computer-readable medium of claim 37, further comprising code for causing the computer to:
start a timer based on the receipt of the first ESM message;
maintain a record of the transaction identifier after sending the second ESM message; and
delete the record if the timer expires or stops.

39. The non-transitory computer-readable medium of claim 37, further comprising code for causing the computer to:
start a timer based on the receipt of the first ESM message;
determine whether the third ESM message is received before the timer expires or stops; and
control whether the fourth ESM message is sent based on the determination.

40. The non-transitory computer-readable medium of claim 37, further comprising code for causing the computer to:
store the transaction identifier in a queue;
determine whether the transaction identifier is in the queue when the third ESM message is received; and
control whether the fourth ESM message is sent based on the determination.

41. The non-transitory computer-readable medium of claim 40, further comprising code for causing the computer to:
determine whether the transaction identifier is associated with a successful transaction; and
control whether the transaction identifier is stored in the queue based on the determination of whether the transaction identifier is associated with a successful transaction.

42. The non-transitory computer-readable medium of claim 40, wherein the queue comprises a first-in first-out memory.

43. The non-transitory computer-readable medium of claim 37, further comprising code for causing the computer to:
maintain a current transaction identifier by incrementing the current transaction identifier every time a new transaction is commenced;

determine whether the transaction identifier included in the third ESM message is within a defined count of the current transaction identifier when the third ESM message is received; and
control whether the fourth ESM message is sent based on the determination.

44. The non-transitory computer-readable medium of claim 37, wherein:
the non-transitory computer-readable medium further comprises code for causing the computer to send a bearer resource request;
the bearer resource request includes the transaction identifier; and
the first ESM message is received as a result of sending the bearer resource request.

45. The non-transitory computer-readable medium of claim 44, wherein:
the bearer resource request comprises a packet data network connectivity request, a bearer resource allocation request, or a bearer resource modification request; and
the first ESM message comprises an activate default EPS bearer context request, an activate dedicated EPS bearer context request, or a modify EPS bearer context request.

46. The non-transitory computer-readable medium of claim 37, further comprising code for causing the computer to:
receive a lower layer indication that the second ESM message was not delivered; and
deactivate an EPS bearer context associated with the EPS bearer context request as a result of the receipt of the lower layer indication.

47. The non-transitory computer-readable medium of claim 37, further comprising code for causing the computer to delay activation or modification of an EPS bearer context associated with the EPS bearer context request until receipt of a lower layer indication that the second ESM message was delivered.

48. The non-transitory computer-readable medium of claim 37, further comprising code for causing the computer to:
receive a lower layer indication that the second ESM message was delivered; and
release the transaction identifier as a result of the receipt of the lower layer indication.

49. A method of communication, comprising:
receiving, by an access terminal, a first evolved packet system (EPS) session management (ESM) message, wherein the first ESM message comprises an EPS bearer context request and includes a transaction identifier;
sending, by the access terminal, a second ESM message in response to the receipt of the first ESM message, wherein the second ESM message accepts the EPS bearer context request;
starting a timer based on the sending of the second ESM message;
receiving, by the access terminal, a lower layer indication that the second ESM message was delivered;
stopping the timer as a result of the receipt of the lower layer indication; and
releasing the transaction identifier as a result of the receipt of the lower layer indication.

50. The method of claim 49, wherein the timer provides an indication of a period of time during which receipt of a retransmission of the first ESM message triggers sending of a third ESM message that accepts the EPS bearer context.

51. The method of claim 50, wherein expiration of the timer provides an indication that receipt of a retransmission of the first ESM message does not trigger sending of a third ESM message that accepts the EPS bearer context.

52. The method of claim 49, further comprising delaying activation or modification of an EPS bearer context associated with the EPS bearer context request until receipt of the lower layer indication.

53. An access terminal, comprising:
a receiving configured to receive a first evolved packet system (EPS) session management (ESM) message, wherein the first ESM message comprises an EPS bearer context request and includes a transaction identifier;
a transmitter configured to send a second ESM message in response to the receipt of the first ESM message, wherein the second ESM message accepts the EPS bearer context request; and
a timing controller configured to start a timer based on the sending of the second ESM message;
the receiver is further configured to receive a lower layer indication that the second ESM message was delivered;
the timing controller is further configured to stop the timer as a result of the receipt of the lower layer indication; and
releasing the transaction identifier as a result of the receipt of the lower layer indication.

54. The access terminal of claim 53, wherein the timer provides an indication of a period of time during which receipt of a retransmission of the first ESM message triggers sending of a third ESM message that accepts the EPS bearer context.

55. An access terminal, comprising:
means for receiving a first evolved packet system (EPS) session management (ESM) message, wherein the first ESM message comprises an EPS bearer context request and includes a transaction identifier;
means for sending a second ESM message in response to the receipt of the first ESM message, wherein the second ESM message accepts the EPS bearer context request;
means for starting a timer based on the sending of the second ESM message;
means for receiving a lower layer indication that the second ESM message was delivered;
means for stopping the timer as a result of the receipt of the lower layer indication; and
means for releasing the transaction identifier as a result of the receipt of the lower layer indication.

56. The access terminal of claim 55, wherein the timer provides an indication of a period of time during which receipt of a retransmission of the first ESM message triggers sending of a third ESM message that accepts the EPS bearer context.

57. A non-transitory computer-readable medium comprising code for causing a computer to:
receive, by an access terminal, a first evolved packet system (EPS) session management (ESM) message, wherein the first ESM message comprises an EPS bearer context request and includes a transaction identifier;
send, by the access terminal, a second ESM message in response to the receipt of the first ESM message, wherein the second ESM message accepts the EPS bearer context request;
start a timer based on the sending of the second ESM message;
receive, by the access terminal, a lower layer indication that the second ESM message was delivered;
stop the timer as a result of the receipt of the lower layer indication; and
release the transaction identifier as a result of the receipt of the lower layer indication.

58. The non-transitory computer-readable medium of claim 57, wherein the timer provides an indication of a period of time during which receipt of a retransmission of the first ESM message triggers sending of a third ESM message that accepts the EPS bearer context.

* * * * *